(12) United States Patent
Picard

(10) Patent No.: US 8,694,964 B1
(45) Date of Patent: Apr. 8, 2014

(54) MANAGING CODE SAMPLES IN DOCUMENTATION

(75) Inventor: Antoine Picard, Mountain View, CA (US)

(73) Assignee: Google Inc., Mountain View, CA (US)

( * ) Notice: Subject to any disclaimer, the term of this patent is extended or adjusted under 35 U.S.C. 154(b) by 218 days.

(21) Appl. No.: 13/070,434

(22) Filed: Mar. 23, 2011

(51) Int. Cl.
*G06F 9/44* (2006.01)
*G06F 17/00* (2006.01)

(52) U.S. Cl.
USPC ............ 717/123; 715/200; 715/255; 717/120

(58) Field of Classification Search
None
See application file for complete search history.

(56) References Cited

U.S. PATENT DOCUMENTS

| | | | |
|---|---|---|---|
| 5,513,305 A * | 4/1996 | Maghbouleh | 715/234 |
| 6,343,297 B1 * | 1/2002 | D'Anjou et al. | 1/1 |
| 6,763,500 B2 * | 7/2004 | Black et al. | 715/234 |
| 7,171,652 B2 * | 1/2007 | Motoyama et al. | 717/123 |
| 7,302,674 B1 * | 11/2007 | Gladieux et al. | 717/101 |
| 7,788,237 B2 * | 8/2010 | Voronov et al. | 707/695 |
| 7,788,640 B2 * | 8/2010 | Grimaldi | 717/123 |
| 7,849,052 B2 * | 12/2010 | Vicars et al. | 707/608 |
| 8,015,487 B2 * | 9/2011 | Roy et al. | 715/255 |
| 8,196,100 B2 * | 6/2012 | Petri | 717/120 |
| 2004/0261016 A1 * | 12/2004 | Glass et al. | 715/512 |
| 2007/0101253 A1 * | 5/2007 | Bohle | 715/507 |
| 2008/0162531 A1 * | 7/2008 | van Eikeren | 707/102 |
| 2010/0185538 A1 * | 7/2010 | King et al. | 705/34 |
| 2011/0320561 A1 * | 12/2011 | Sato | 709/217 |

OTHER PUBLICATIONS

"Greasemonkey," Wikipedia, Last Modified Jun. 5, 2011, 4 pages, [online] [retrieved on Jul. 13, 2011] Retrieved from the internet <URL:http://en.wikipedia.org/wiki/Greasemonkey>.
Aleksey, B., "How we maintain documentation," LemonStand Blog, Aug. 4, 2010, 4 pages, [online] [retrieved on Jul. 13, 2011] Retrieved from the internet <URL: http://lemonstandapp.com/blog/post/how_we_maintain_documentation/>.

* cited by examiner

*Primary Examiner* — Don Wong
*Assistant Examiner* — Hossain Morshed
(74) *Attorney, Agent, or Firm* — Fenwick & West LLP

(57) ABSTRACT

Documentation having code samples is managed. Documentation describing programming code for a software product is received. The documentation references a code sample having an associated test module for determining whether the code sample is valid. The code sample is tested by executing the associated test module to produce a test result indicating whether the code sample is valid. The documentation, code sample, and test result are stored. The documentation, code sample, and test result may be provided to a client adapted to display the code sample and test result to a user of the client. Invalid code samples in the documentation may be identified using the test modules and the invalid code samples may be replaced to make the code samples valid.

33 Claims, 5 Drawing Sheets

MANAGING CODE SAMPLES IN DOCUMENTATION

BACKGROUND

1. Field of Art

The present invention generally relates to the field of software development and in particular to creating and managing documentation for software products.

2. Background of the Invention

Enterprises that develop software have an ongoing need to document the software code. The documentation is helpful to explain how or why the code was developed, and may assist in future attempts to improve or extend the code. The documentation typically includes electronic documentation of application programming interfaces (APIs) used in the code, and may also include code samples showing how the APIs are used. Ideally, the code samples in the documentation are functional, so that a developer reviewing the documentation can copy-and-paste the code sample from the documentation into development code.

However, it is difficult to create and maintain documentation containing working code samples. One problem is that people who write documentation often use a word processor, rather than a coding tool, to write the code samples. The word processor lacks development tools present in a coding tool and, as a result, the code samples in the documentation may contain typographical or other errors that make the samples non-functional. Sometimes, people writing documentation use the coding tools to write the code samples and then copy the samples from the tools to the documentation. However, subsequent edits to the documentation can still introduce errors into the code samples.

Bit rot is another reason why code samples in documentation are often non-functional. Generally, code samples in documentation remain static while real-world code evolves. As a result, the code samples in the documentation become stale (known as "bit rot"). For example, the dependencies of a code sample may change, rendering it inoperable.

SUMMARY

The above and other issues are addressed by a computer-implemented method, non-transitory computer readable storage medium, and computer system for managing documentation having a code sample. An embodiment of the method comprises receiving documentation describing programming code for a software product. The documentation includes a code reference specifying a location of the code sample within a code repository. The code sample has an associated test module for determining whether the code sample is valid. The method further comprises testing the code sample by executing the associated test module using a computer processor to produce a test result indicating whether the code sample is valid and storing the documentation, code sample, and test result.

An embodiment of the medium stores executable computer program instructions for managing documentation having a code sample. The instructions receive documentation describing programming code for a software product. The documentation includes a code reference specifying a location of the code sample within a code repository. The code sample has an associated test module for determining whether the code sample is valid. The instructions further test the code sample using the associated test module to produce a test result indicating whether the code sample is valid and store the documentation, code sample, and test result.

An embodiment of the computer system for managing documentation having a code sample comprises at least one non-transitory computer-readable storage medium storing executable computer program instructions. The instructions comprise instructions for receiving documentation describing programming code for a software product. The documentation includes a code reference specifying a location of the code sample within a code repository. The code sample has an associated test module for determining whether the code sample is valid. The instructions further test the code sample using the associated test module to produce a test result indicating whether the code sample is valid and store the documentation, code sample, and test result. The computer system also comprises a processor for executing the computer program instructions.

An embodiment of a computer-implemented method of maintaining documentation describing programming code for a software product comprises storing the documentation in a documentation repository. The documentation references a plurality of code samples in a code repository having associated test modules for determining whether the code samples are invalid. The method further identifies invalid code samples referenced by the documentation by executing the associated test modules using a computer processor and replaces the references to identified invalid code samples with references to valid code samples in the code repository.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
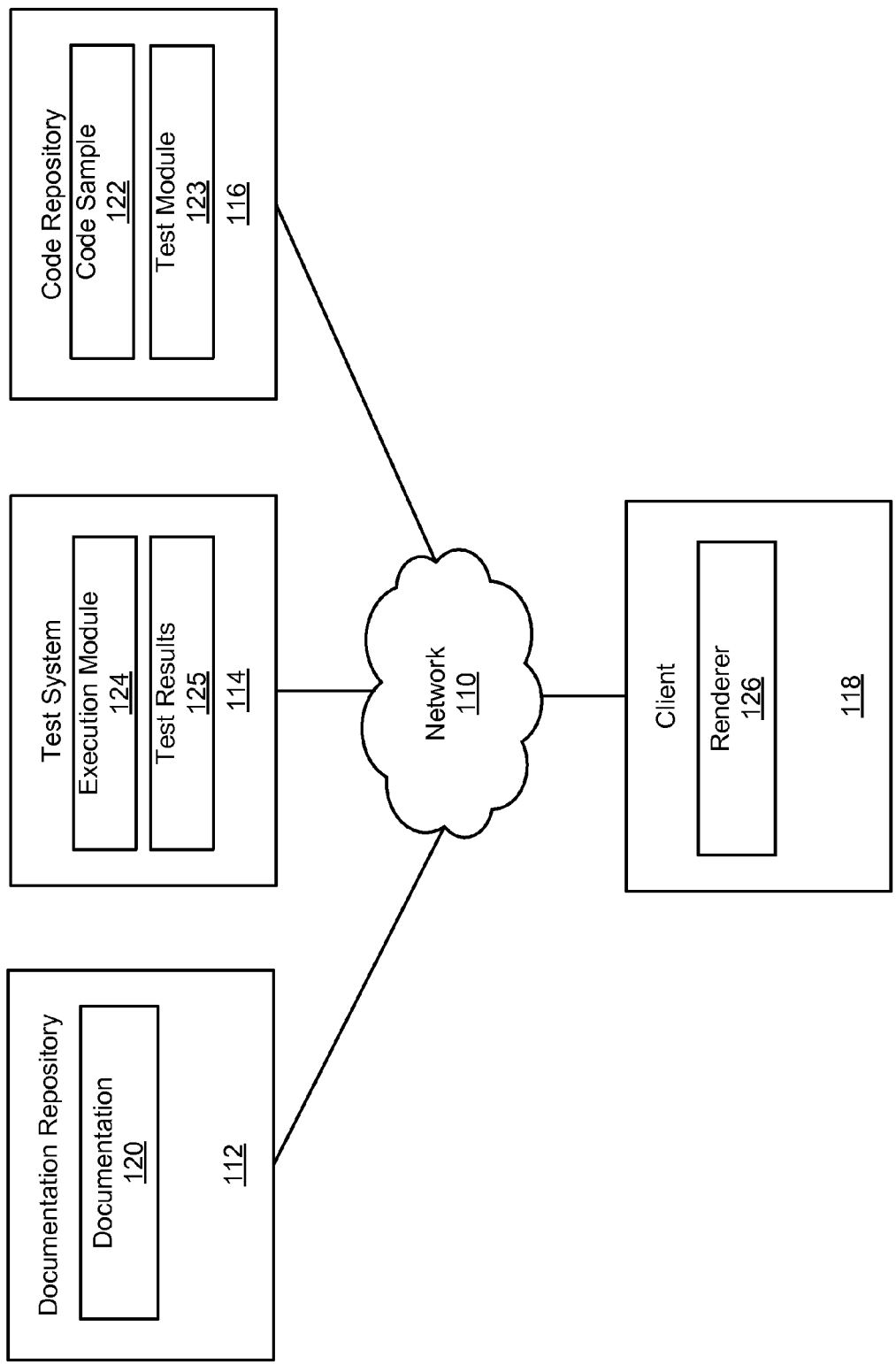
FIG. 1 is a high-level block diagram illustrating an environment for managing code samples in documentation according to one embodiment.

FIG. 1 is a high-level block diagram illustrating an environment 100 for managing code samples in documentation according to one embodiment. The environment 100 can be maintained by an enterprise that performs software development, such as a corporation, university, or government agency. As shown, the environment 100 includes a network 110, a documentation repository 112, a test system 114, a code repository 116, and a client 118. While only one of each entity is shown in FIG. 1 for clarity, embodiments can have multiple repositories and systems of each type and many clients 116.

The network 110 represents the communication pathway between the documentation repository 112, test system 114, code repository 116, and client 118. In one embodiment, the network 110 uses standard communications technologies and/or protocols and can include the Internet. Thus, the network 110 can include links using technologies such as Ethernet, 802.11, worldwide interoperability for microwave access (WiMAX), 2 G/3 G/4 G mobile communications protocols, digital subscriber line (DSL), asynchronous transfer mode (ATM), InfiniBand, PCI Express Advanced Switching, etc. Similarly, the networking protocols used on the network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 110 can be represented using technologies and/or formats including image data in binary form (e.g. Portable Network Graphics (PNG)), the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities on the network 110 can use custom and/or dedicated data communications technologies instead of, or in addition to, the ones described above.

The documentation repository 112 is a computer that stores documentation 120 describing programming code for a software product made by the enterprise. For example, the document repository 112 can store documentation 120 describing a software product that the enterprise sells to end users, and/or documentation describing an internal software product (e.g., a software tool) used within the enterprise. In one embodiment, the documentation repository 112 includes a web server that provides pages of documentation 120 to clients 118 in response to requests.

The documentation 120 describes how to use features of the software product, such as how to use an application programming interface (API) supported by the product. The documentation 120 is authored by a developer of the software product, a technical writer, and/or another author. The documentation 120 identifies a code sample 122 that is described within the documentation. The code sample 122, for instance, can show a unit of code that correctly calls a method or function using an API described by the documentation. In addition, the documentation 120 references test results indicating whether the code sample is valid—i.e., whether the code sample is functional in its current form. In one embodiment, the document repository 112 stores multiple units of documentation, and each unit of documentation can reference one or more different code samples 122 and test results.

The code repository 116 is a computer that stores code samples 122 so that the samples can be referenced by the documentation 120 in the documentation repository 112. The code repository 116 also provides the code samples 122 in response to requests for them. The code samples 122 are formed of text in one embodiment, and the code repository 116 can store the code samples using any of a variety of suitable techniques. For instance, the repository 116 can store the code samples 122 in text files having specified names and paths (i.e., fully qualified file names). A single text file can hold multiple code samples, with each code sample delimited within the file by an identifier such as a line number, tag, name of the code unit (e.g., method name), etc. The repository 116 can also store the code samples 122 using other techniques, such as within a relational database keyed by a unique identifier such as the name of the code unit. Thus, a requester can request a code sample 122 by providing the fully qualified file name and/or an identifier of the code sample to the code repository 116. In one embodiment, the code repository 116 is a subset of a larger code repository that also stores production code used by the enterprise.

In one embodiment, the code repository 116 also stores test modules 123 for testing the code samples 122 referenced by the documentation 120. In general, a test module 123 is a program that tests the code in an associated code sample 122 to determine whether the sample is valid or invalid (i.e., functional or non-functional) and reports the result of the test. The test modules 123 can be created by the authors of the documentation 120 and/or by other entities. In some embodiments the testing and reporting functions are distributed among multiple modules.

In one embodiment, a test module 123 is written in the same types of code as the code samples 122. The test module 123 can include source code stored within text files and/or executable files that can be executed in their stored form. Depending upon the embodiment and code samples 122, a test module 123 can test multiple code samples 122 or test a single code sample. The test module 123 can likewise be a member of a collection of test modules that collectively form a testing framework for the code samples and/or documented software product.

The test module 123 performs a unit test on a code sample 122. A unit is the smallest testable part of a software product, such as a function, procedure, or method. The specific types of testing performed by the test module 123 can vary in different embodiments and/or depending upon the associated code sample 122.

The test system 114 is a computer that stores one or more test execution modules 124 (called "execution modules") for testing the code samples 122 using the test modules 123. An execution module 124 identifies a test module 123 in the code repository 116 and executes the test module to test the associated code sample 122. The execution module 124 can execute the test module 123 automatically according to predetermined conditions and/or upon request.

In one embodiment, the execution module 124 performs continuous testing of the code sample 122 using the test module 123. At the start of a testing cycle, the execution module 124 synchronizes on the current state of the codebase for the software product (i.e., obtains the current set of code for the software product), and then executes the test module 123 to test the code sample 122 using the current codebase. Once the test is completed, the execution module 124 again synchronizes on the current state of the codebase and repeats the testing cycle. Any updates that occur to the codebase while testing is being performed are not tested until the previous test cycle ends and the testing synchronizes on the codebase having the new updates. Continuous testing is often used in environments where the test system 114 executes the execution module 124 on a single computer.

In another embodiment, the execution module 124 performs dependency testing of the code sample 122. Under this type of testing, when the codebase is updated the execution module 124 analyzes the update to identify any dependencies affected by it. The execution module 124 then determines whether the code sample 122 describes code dependent on the updated portion of the codebase (or directly involved in the update) and, if so, schedules and then tests the code sample 122 using the test module 123. The execution module 124 repeats this process for each codebase update. Dependency testing is often used in environments where the test system 114 executes multiple execution modules 124 on multiple computers because the scheduled tests can be distributed across the computers.

A test results module 125 on the test system 114 records the result of the test in association with the code sample 122. For instance, the test results module 125 can record the result in a relational database and/or using another technique. A requester can access the test results module 125 and request the result of the test on the code sample 122. In response, the test results module 125 responds to the request with information indicating whether the code sample 122 is valid. The test results module 125 can also provide additional information, such as the type of testing that was performed on the code sample 122 and/or reasons that the code sample was found invalid.

The client 118 is a computer used by a user viewing the documentation 120 in the documentation repository 112. The client includes a renderer module ("renderer") 126 that displays the documentation 120 from the documentation repository 112, including the appropriate code samples 122 from the code repository 116 and the results of the testing from the test system 114. In one embodiment, the renderer 126 is a web browser that displays the documentation 120 on a monitor of the computer.

The renderer 126 obtains the documentation 120 from the documentation repository 112 at the request of the user. For example, the user can select a link on a web page provided by the web server associated with the document repository 112 that causes the repository to provide the documentation 120 to the renderer 126. In one embodiment, the renderer 126 then parses the documentation 120 to obtain the code samples 122 and associated test results from the code repository 116 and test system 114 and displays the code samples and test results within the documentation.

The renderer 126 can use a variety of different techniques to indicate whether the code sample is valid. For example, the renderer 126 can display an icon that graphically indicates whether the code sample is valid. The icon can also indicate other information, such as the type of testing performed on the code sample 122. The icon can include a hyperlink that the user can select to view the details of the execution module 124 that tested the code sample and why the code is valid or invalid. In another example, the renderer 126 can display the text and/or the background of the text of the code sample 122 in a color that indicates whether the code is valid, such as displaying valid code in green and invalid code in red.

Thus, the user of the client 118 can view documentation describing a code unit, a code sample showing the code unit, and an assertion of whether the code sample is valid. If the code is valid, the user can, e.g., copy the code sample and paste it into development code. In addition, the test results 125 in the test system 114 can be used to identify invalid code samples 122 referenced by the documentation 120. A developer, technical writer, and/or automated process can revise the invalid code samples 122 to make them valid, and thereby improve the quality of the documentation 120.

Figure 2:
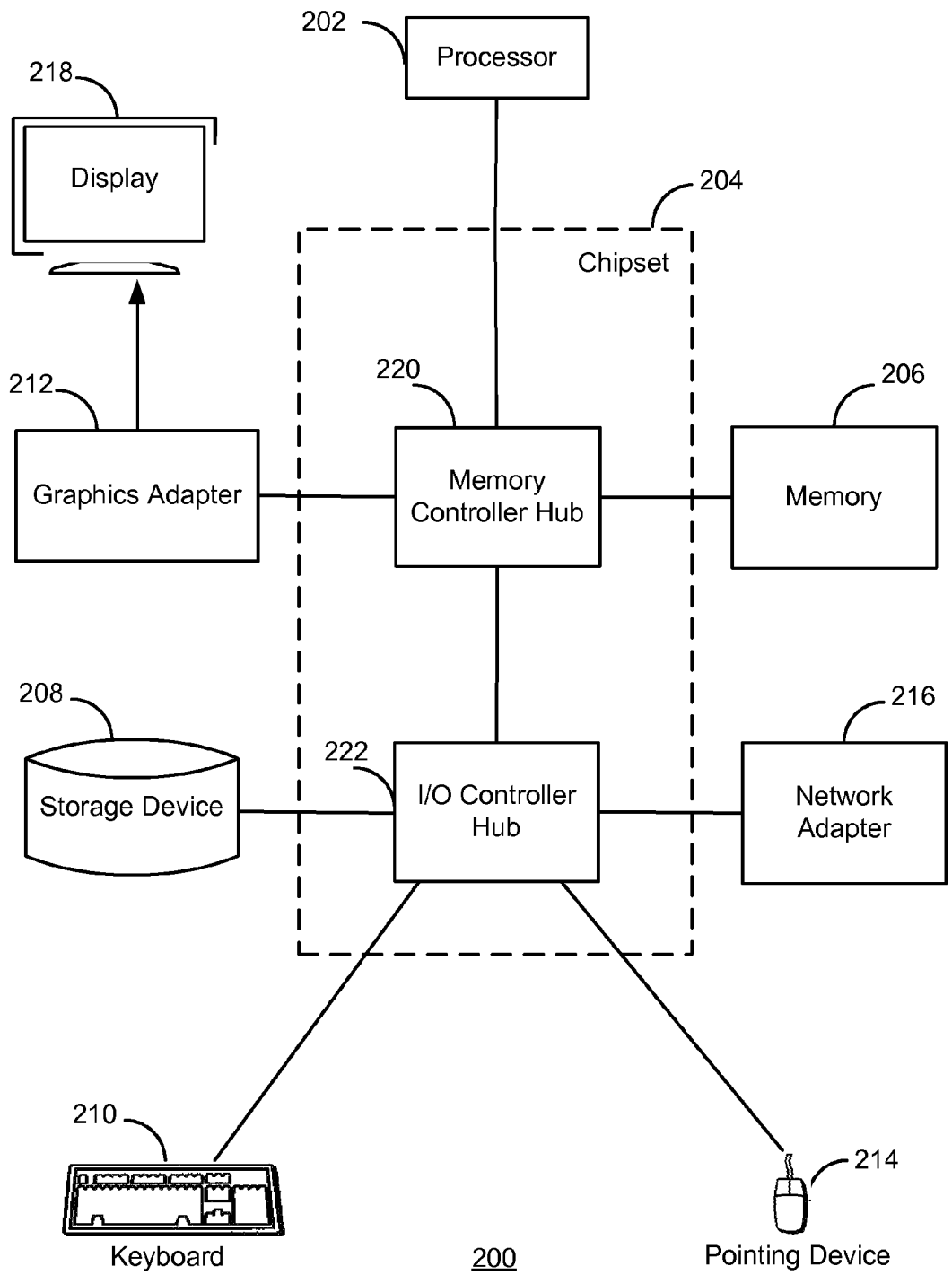
FIG. 2 is a high-level block diagram illustrating an example of a computer for use as a documentation repository, test system, code repository, and/or client, in accordance with one embodiment.

FIG. 2 is a high-level block diagram illustrating an example of a computer 200 for use as a documentation repository 112, test system 114, code repository 116, and/or client 118, in accordance with one embodiment. Illustrated are at least one processor 202 coupled to a chipset 204. The chipset 204 includes a memory controller hub 250 and an input/output (I/O) controller hub 255. A memory 206 and a graphics adapter 213 are coupled to the memory controller hub 250, and a display device 218 is coupled to the graphics adapter 213. A storage device 208, keyboard 210, pointing device 214, and network adapter 216 are coupled to the I/O controller hub 255. Other embodiments of the computer 200 have different architectures. For example, the memory 206 is directly coupled to the processor 202 in some embodiments.

The storage device 208 includes one or more non-transitory computer-readable storage media such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 213 displays images and other information on the display device 218. In some embodiments, the display device 218 includes a touch screen capability for receiving user input and selections. The network adapter 216 couples the computer system 200 to the network 110. Some embodiments of the computer 200 have different and/or other components than those shown in FIG. 2. For example, the repositories 112, 114, 116 can be formed of multiple blade servers and lack a display device, keyboard, and other components while the client 118 can be a notebook or desktop computer, a tablet computer, or a mobile phone.

The computer 200 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3:
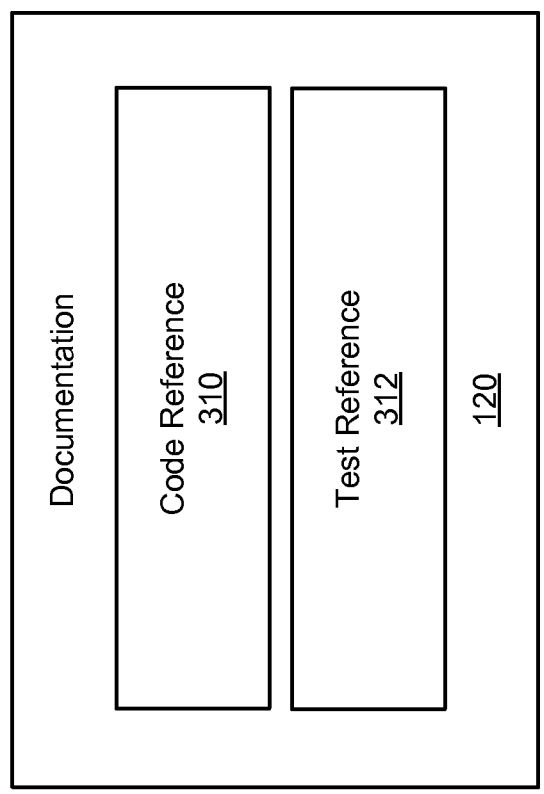
FIG. 3 is a high-level block diagram illustrating a detailed view of the documentation stored and provided by the documentation repository, according to one embodiment.

FIG. 3 is a high-level block diagram illustrating a detailed view of the documentation 120 stored and provided by the document repository 112, according to one embodiment. In one embodiment, the documentation 120 is formed of multiple individual files, with each file holding content describing a particular software product or aspect of a software product such as a code unit. The documentation 120 can be tagged with metadata describing the information contained therein. For example, the documentation 120 can include multiple web pages represented in HTML, XML, or another markup language. Collectively the web pages can form a website such as a wiki that allows users of the clients 118 to view, edit, and comment on the documentation 120.

As shown in FIG. 3, the documentation 120 includes a code reference 310 and a test reference 312. The code reference 310 references the code sample 122 described by the documentation 120. In one embodiment, the code reference 310 includes a tag that specifies the location of the code sample 122 within the code repository 116 associated with the content of the particular page and/or file of documentation 120. The code reference 310 specifies the fully-qualified path to the file containing the code sample 122 within the code repository 116. In addition, the code reference 310 can specify additional information that is used to identify and/or obtain the code sample 122, such as the name of the code unit within the file at the code repository 116 and the location of the code within the file (e.g., the line numbers within the file that contain the associated code sample).

The test reference 312 references the test results associated with the code sample 122 described by the documentation. In one embodiment, the test reference 312 includes a tag that specifies the location of the test results within the test results module 125 of the test system 114. The test reference 312 can also specify additional information describing the test module 123, the code sample 122, or the documentation 120. For example, the test reference 312 can specify the name or another identifier of the code sample 122 that the test results module 125 uses to identify the appropriate test results.

In one embodiment, when the renderer 126 at the client 118 receives the documentation 120 from the documentation repository 112, the renderer 126 identifies the code 310 and test references 312 and uses the references to obtain the referenced content from the code repository 116 and test system 114. Thus, the renderer 126 can use the code reference 310 to get the code sample 122 from the code repository 116 and use the test reference 312 to get the test result from the test results module 125 of the test system 114. In another embodiment, the documentation repository 112 itself includes functionality for using the code 310 and/or test 312 references to obtain the code sample 122 and test results from the code repository 116 and test system 114 and integrates the obtained content into the documentation 120. The document repository 112 then provides the integrated documentation 120 to the client 118.

The implementation of the code 310 and test 312 references can vary in different embodiments. For example, one or both of the references 310, 312 can be implemented as HTML hyperlinks that are parsed and used by the renderer 126 to obtain the referenced code sample 122 and test results. Additionally, the references 310, 312 can be implemented as executable code, such as JAVASCRIPT code, that is automatically executed by the client 118 when the rendering module 126 renders the page containing the documentation 120 to obtain the code sample 122 and test results. The executable code can display the code sample 122 within a frame of the documentation page along with the test results.

The references 310, 312 can also be implemented as browser helper objects or other forms of plug-ins to the renderer 126. In this embodiment, the user of the client 118 obtains one or more plug-ins from the documentation repository 112 and/or another source and installs it into the renderer 126. The references 310, 312 include tags that activate the plug-in and cause the plug-in to execute and obtain the code sample 122 and test result.

The documentation 120 can further include the code sample 122 and test module 123 embedded directly within the documentation. In this embodiment, the code 310 and test 312 references effectively reference locations within the same document that includes the remainder of the documentation 120. Similarly, the test results 125 are embedded directly within the documentation 120 in some embodiments.

Figure 4:
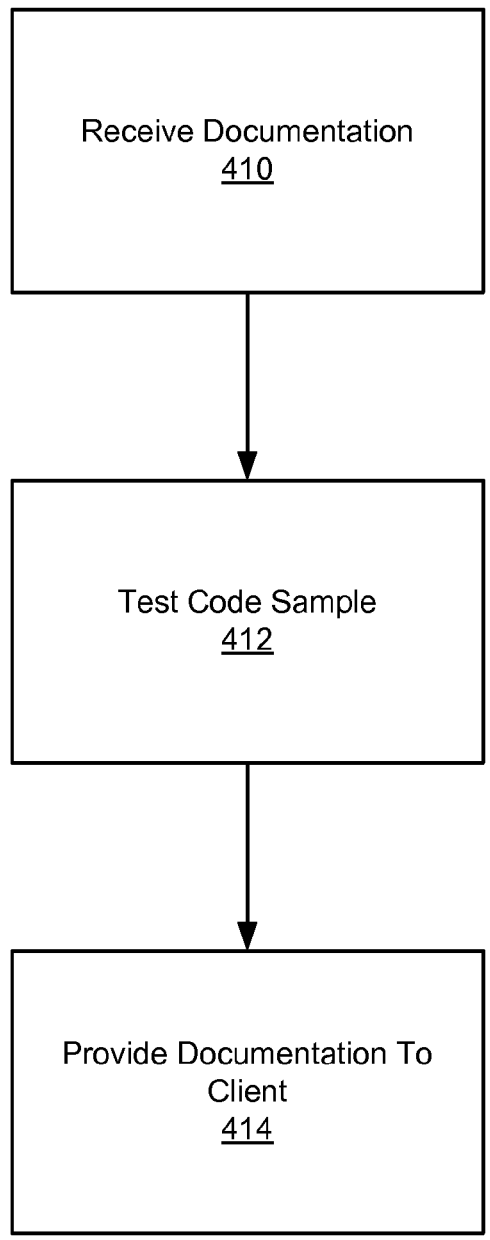
FIG. 4 is a flowchart illustrating a method of providing documentation having embedded and validated code samples according to one embodiment.

FIG. 4 is a flowchart illustrating a method of providing documentation 120 having embedded and validated code samples according to one embodiment. Other embodiments can perform the steps in different orders and can include different and/or additional steps. In addition, some or all of the steps can be performed by entities other than those shown in FIG. 1.

The documentation repository 112 receives 410 documentation 120. The documentation 120 is created by a developer or technical writer for a software product and includes a code reference 310 and a test reference 312. For example, the documentation 120 can be a HTML file having a textual description of a feature of the software product, and hypertext links to a code sample 122 demonstrating proper use of the feature, and to test results in the test results module 125 of the test system 114 indicating whether the code sample is valid.

The test system 114 or another entity uses an execution module 124 to test 412 the code sample 122 using a test module 123. The types of test 412 and time of testing can vary in different embodiments. In one embodiment the execution module 124 performs continuous testing of the code sample 122 while in another embodiment the execution module performs dependency testing. The testing 412 determines whether the code sample 122 is valid or invalid and the execution module 124 records the result of the test in the test results module 125 of the test system 114.

The document repository 112 provides 414 the documentation to a client 118. For example, the documentation repository 112 can include a web server that provides the documentation in response to a request from a web browser or other renderer 126 at the client 118. The provided documentation 120 includes the code sample 122 and the results of the testing performed by the execution module 124. The document repository 112 can obtain the code sample 122 and/or results and provide it to the client 118 within the documentation, or the client 118 can obtain the sample/results from the code repository 116 and test system 114 when rendering the documentation. The documentation rendered at the client 118 indicates whether the code sample is valid by using text, an icon, color, or another technique.

Thus, the environment 100 described above allows developers of a software product to view documentation 120 including samples of code demonstrating how to use features of the product. In addition, the documentation 120 indicates whether the code samples are valid. Additionally, other environments can represent the documentation 120 using different techniques, such as by embedding the code sample 122 and/or test module 123 directly into the documentation held by the documentation repository 122.

Figure 5:
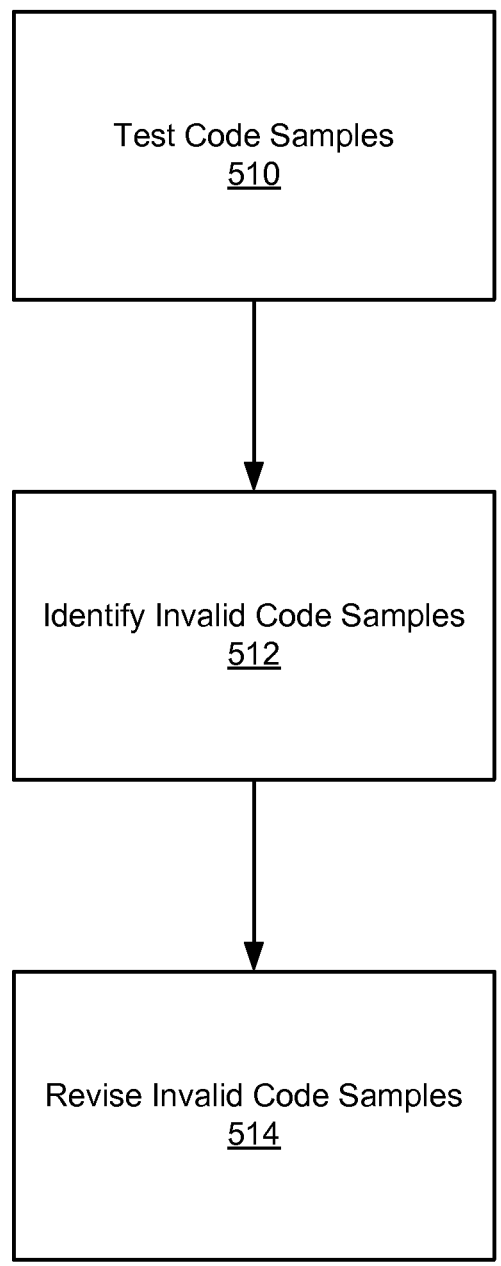
FIG. 5 is a flowchart illustrating a method of identifying and revising invalid code samples according to one embodiment.

FIG. 5 is a flowchart illustrating a method of identifying and revising invalid code samples according to one embodiment. Other embodiments can perform the steps in different orders and can include different and/or additional steps. In addition, some or all of the steps can be performed by entities other than those shown in FIG. 1.

Code samples 122 stored within the code repository 116 are tested 510 to determine whether the code samples are valid. The test system 114 or another entity performs this testing 510 by using the execution modules 124 to execute the test modules 123 to test the code samples 122. The testing can test all or a selected subset of the code samples 122. The types of test 510 and time of testing can vary in different embodiments and can include continuous testing, dependency testing, and/or on-demand testing.

The testing 510 identifies 512 invalid code samples. As the tests execute, individual code samples 122 are identified as valid or invalid and the execution module 124 records the result of the test in the test results module 125 of the test system 114. Thus, the test results 125 identify 512 the set of code samples that are invalid. The invalid code samples are revised 514 to make the code samples valid.

The revising 514 can be performed using manual and/or automated processes. A developer or technical writer can review the test results 125 to identify the reason that a code sample 122 is invalid, and manually revise the code sample 122 to make it valid. Likewise, one or more automated processes can be configured to revise code samples that are invalid due to certain types of errors. The automated process can be configured to programmatically revise the code samples by replacing portions of the code samples with revised portions, rearranging and/or changing parameters, and/or making other changes. For example, if a set of code samples 122 are invalid because the name of a method called by the code samples changed, an automated process can update the code samples to use the new name of the method. In addition, the automated process can replace the references to invalid code samples in the documentation 120 with references to updated code samples in the code repository 116.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of managing documentation having a code sample, the method comprising:
   receiving documentation describing programming code for a software product, the documentation including a code reference specifying a location of the code sample within a code repository, the code sample having an associated test module for determining whether the code sample is valid;
   responsive to an update of a first portion of code stored within the code repository and not included in the code sample, determining whether the code sample includes a second portion of code dependent on the updated first portion of code;
   testing the code sample responsive to determining that the code sample includes a second portion of code dependent on the updated first portion of code by executing the associated test module using a computer processor to produce a test result indicating whether the code sample is valid; and
   storing the documentation, code sample, and test result.

2. The computer-implemented method of claim 1, wherein the documentation is received from an author of the documentation.

3. The computer-implemented method of claim 1, wherein the documentation comprises:
   a test reference specifying a location of the test result within a test system.

4. The computer-implemented method of claim 3, further comprising:
   accessing the test reference from the documentation;
   accessing the test result stored at the location specified in the test reference within the test system; and
   responsive to the accessed test result indicating that the code sample is invalid, replacing the code sample with an updated code sample.

5. The computer-implemented method of claim 1, wherein testing the code sample by executing the associated test module comprises:
   accessing a current state of a codebase for the software product;
   testing the code sample using the accessed current state of the codebase to produce a current test result; and
   repeating the accessing and testing using the accessed current state of the codebase to produce an updated test result.

6. The computer-implemented method of claim 1, further comprising:
   providing the documentation, code sample, and test result to a client, the client adapted to display the code sample and test result to a user of the client.

7. The computer-implemented method of claim 6, wherein providing the documentation, code sample, and test result to the client comprises:
   providing the client with a page having content in a markup language, the content including the code reference specifying the location of the code sample within the code repository and a test reference specifying a location of the test result within a test system;
   wherein a renderer at the client is adapted to parse the content in the markup language to obtain the code sample using the code reference and obtain the test result using the test reference and display the code sample and test result to the user of the client.

8. The computer-implemented method of claim 7, wherein at least one of the code reference and test reference comprises executable code adapted to execute on the client responsive to the renderer parsing the content to obtain the code sample and/or test result.

9. The computer-implemented method of claim 7, wherein at least one of the code reference and test reference includes a tag that causes a plug-in of the renderer to execute on the client responsive to the renderer parsing the content to obtain the code sample and/or test result.

10. The computer-implemented method of claim 1, wherein the client is adapted to display the test result using a graphical icon that indicates whether the code sample is valid.

11. The computer-implemented method of claim 1, wherein determining whether the code sample includes a second portion of code dependent on the updated first portion of code comprises performing dependency testing on the code sample to identify the dependency of the second portion of code on the updated first portion of code.

12. A non-transitory computer-readable storage medium storing executable computer program instructions for managing documentation having a code sample, the instructions performing steps comprising:
   receiving documentation describing programming code for a software product, the documentation including a code reference specifying a location of the code sample within a code repository, the code sample having an associated test module for determining whether the code sample is valid;
   responsive to an update of a first portion of code stored within the code repository and not included in the code sample, determining whether the code sample includes a second portion of code dependent on the updated first portion of code;
   testing the code sample responsive to determining that the code sample includes a second portion of code dependent on the updated first portion of code using the associated test module to produce a test result indicating whether the code sample is valid; and
   storing the documentation, code sample, and test result.

13. The computer-readable storage medium of claim 12, wherein the documentation is received from an author of the documentation.

14. The computer-readable storage medium of claim 12, wherein the documentation comprises:
   a test reference specifying a location of the test result within a test system.

15. The computer-readable storage medium of claim 14, wherein the instructions further perform steps comprising:
   accessing the test reference from the documentation;
   accessing the test result stored at the location specified in the test reference within the test system; and
   responsive to the accessed test result indicating that the code sample is invalid, replacing the code sample with an updated code sample.

16. The computer-readable storage medium of claim 12, wherein testing the code sample by executing the associated test module comprises:
   accessing a current state of a codebase for the software product;
   testing the code sample using the accessed current state of the codebase to produce a current test result; and repeating the accessing and testing using the accessed current state of the codebase to produce an updated test result.

17. The computer-readable storage medium of claim 12, wherein the instructions further perform steps comprising:
providing the documentation, code sample, and test result to a client, the client adapted to display the code sample and test result to a user of the client.

18. The computer-readable storage medium of claim 17, wherein providing the documentation, code sample, and test result to the client comprises:
providing the client with a page having content in a markup language, the content including the code reference specifying the location of the code sample within the code repository and a test reference specifying a location of the test result within a test system;
wherein a renderer at the client is adapted to parse the content in the markup language to obtain the code sample using the code reference and obtain the test result using the test reference and display the code sample and test result to the user of the client.

19. The computer-readable storage medium of claim 18, wherein at least one of the code reference and test reference comprises executable code adapted to execute on the client responsive to the renderer parsing the content to obtain the code sample and/or test result.

20. The computer-readable storage medium of claim 18, wherein at least one of the code reference and test reference includes a tag that causes a plug-in of the renderer to execute on the client responsive to the renderer parsing the content to obtain the code sample and/or test result.

21. The computer-readable storage medium of claim 12, wherein the client is adapted to display the test result using a graphical icon that indicates whether the code sample is valid.

22. The computer-readable storage medium of claim 12, wherein determining whether the code sample includes a second portion of code dependent on the updated first portion of code comprises performing dependency testing on the code sample to identify the dependency of the second portion of code on the updated first portion of code.

23. A computer system for managing documentation having a code sample, comprising:
at least one non-transitory computer-readable storage medium storing executable computer program instructions comprising instructions for:
receiving documentation describing programming code for a software product, the documentation including a code reference specifying a location of the code sample within a code repository, the code sample having an associated test module for determining whether the code sample is valid;
responsive to an update of a first portion of code stored within the code repository and not included in the code sample, determining whether the code sample includes a second portion of code dependent on the updated first portion of code;
testing the code sample responsive to determining that the code sample includes a second portion of code dependent on the updated first portion of code using the associated test module to produce a test result indicating whether the code sample is valid; and
storing the documentation, code sample, and test result; and
a processor for executing the computer program instructions.

24. The computer system of claim 23, wherein the documentation is received from an author of the documentation.

25. The computer system of claim 23, further comprising instructions for:
providing the documentation, code sample, and test result to a client, the client adapted to display the code sample and test result to a user of the client.

26. The computer system of claim 23, wherein testing the code sample by executing the associated test module comprises:
accessing a current state of a codebase for the software product;
testing the code sample using the accessed current state of the codebase to produce a current test result; and
repeating the accessing and testing using the accessed current state of the codebase to produce an updated test result.

27. The computer system of claim 23, wherein providing the documentation, code sample, and test result to the client comprises:
providing the client with a page having content in a markup language, the content including the code reference specifying the location of the code sample within the code repository and a test reference specifying a location of the test result within a test system;
wherein a renderer at the client is adapted to parse the content in the markup language to obtain the code sample using the code reference and obtain the test result using the test reference and display the code sample and test result to the user of the client.

28. The computer system of claim 23, wherein the documentation comprises a test reference specifying a location of the test result within a test system, and wherein the computer-readable storage medium further stores instructions for:
accessing the test reference from the documentation;
accessing the test result stored at the location specified in the test reference within the test system; and
responsive to the accessed test result indicating that the code sample is invalid, replacing the code sample with an updated code sample.

29. The computer system of claim 23, wherein determining whether the code sample includes a second portion of code dependent on the updated first portion of code comprises performing dependency testing on the code sample to identify the dependency of the second portion of code on the updated first portion of code.

30. A computer-implemented method of maintaining documentation describing programming code for a software product, the method comprising:
storing the documentation in a documentation repository, the documentation referencing a plurality of code samples in a code repository having associated test modules for determining whether the code samples are invalid;
responsive to an update of a first portion of code stored in the code repository, identifying one or more code samples including additional portions of code dependent on the updated first portion of code, the identified one or more code samples not including the first portion of code;
identifying invalid code samples referenced by the documentation by executing the test modules associated with the identified one or more code samples using a computer processor; and
replacing the references to identified invalid code samples with references to valid code samples in the code repository.

31. The computer-implemented method of claim 30, wherein identifying invalid code samples comprises:

testing the identified one or more code samples using the associated test modules to produce a plurality of test results, each test result indicating whether an associated code sample is invalid.

32. The computer-implemented method of claim 30, wherein identifying invalid code samples comprises:

accessing a current state of a codebase for the software product;

testing the identified one or more code samples using the accessed current state of the codebase to produce current test results; and repeating the accessing and testing using the accessed current state of the codebase to produce updated test results.

33. The computer-implemented method of claim 30, wherein identifying one or more code samples including additional portions of code dependent on the updated first portion of code comprises performing dependency testing on the one or more code samples to identify the dependency of the additional portions of code on the updated first portion of code.

* * * * *